United States Patent [19]

New et al.

[11] Patent Number: 5,553,301

[45] Date of Patent: Sep. 3, 1996

[54] PROGRAMMABLE SEQUENCHER HAVING INTERNAL COMPONENTS WHICH ARE MICROPROCESSOR READ/WRITE INTERFACABLE

[75] Inventors: Bernard J. New, Los Gatos; Philip Freidin, Sunnyvale, both of Calif.

[73] Assignee: Advanced Micro Devices, Inc., Sunnyvale, Calif.

[21] Appl. No.: 24,819

[22] Filed: Mar. 1, 1993

Related U.S. Application Data

[63] Continuation of Ser. No. 601,039, Oct. 23, 1990, abandoned, which is a continuation of Ser. No. 401,522, Aug. 28, 1989, abandoned, which is a continuation of Ser. No. 167,592, Mar. 14, 1988, abandoned.

[51] Int. Cl.$^6$ .................................................. G06F 13/20
[52] U.S. Cl. .................. 395/825; 395/183.22; 395/800; 395/309; 364/DIG. 1; 364/DIG. 2
[58] Field of Search ..................... 395/200, 325, 395/250, 275, 800, 400, 425, 575, 500, 550, 164, 375, 750, 825, 183.22, 404, 412, 700, 497, 182.19, 309; 364/DIG. 1, DIG. 2, 716; 340/825.86, 825.87, 825.89, 298, 825.05; 371/42, 22.2, 22.5, 51.1, 12, 68.3, 61

[56] References Cited

U.S. PATENT DOCUMENTS

| | | | |
|---|---|---|---|
| 4,041,471 | 8/1977 | Krossa et al. | 395/775 |
| 4,354,225 | 10/1982 | Frieder et al. | 395/275 |
| 4,379,328 | 4/1983 | Catiller et al. | 364/200 |
| 4,390,966 | 6/1983 | Kawashima et al. | 364/900 |
| 4,409,656 | 10/1983 | Anderson et al. | 395/275 |
| 4,447,876 | 5/1984 | Moore | 364/200 |
| 4,504,901 | 3/1985 | Calvignac et al. | 364/200 |
| 4,509,113 | 4/1985 | Heath | 364/200 |
| 4,593,375 | 6/1986 | Gershenson | 395/275 |
| 4,630,194 | 12/1986 | Oliver et al. | 364/200 |
| 4,718,038 | 1/1988 | Yoshida | 395/425 |
| 4,782,461 | 11/1988 | Mick et al. | 395/500 |
| 4,835,414 | 5/1989 | Freidin | 364/716 |
| 4,837,739 | 6/1989 | McGlll et al. | 395/575 |
| 4,855,905 | 8/1989 | Estrada et al. | 395/500 |
| 4,884,195 | 11/1989 | Endo | 395/200 |
| 4,910,666 | 3/1990 | Nibby, Jr. et al. | 395/575 |
| 4,930,065 | 5/1990 | McLagan et al. | 395/275 |
| 4,967,346 | 10/1990 | Freidin | 395/500 |
| 4,985,848 | 1/1991 | Pfeiffer et al. | 395/164 |
| 4,996,661 | 2/1991 | Cox et al. | 364/726 |
| 5,012,441 | 4/1991 | Retter | 364/726 |
| 5,018,091 | 5/1991 | du Chene et al. | 364/726 |
| 5,056,041 | 10/1991 | Guttag et al. | 395/164 |
| 5,084,814 | 1/1992 | Vaglica et al. | 395/325 |
| 5,179,716 | 1/1993 | Agrawal | 395/800 |

FOREIGN PATENT DOCUMENTS 62-050944  3/1987  Japan .

OTHER PUBLICATIONS

Advanced Micro Devices, Inc., "Bipolar Microprocessor Logic and Interace," 1983, AM2900 Family 1983 Data Book, pp. 5–1 to 5–139.

"CRC Standard Mathematical Tables"; William H. Beyer, Ph. D., 26th Edition, published by CRC Press, Inc.; p. 16 and cover page.

An Intractive Diagnostic/Debugging Subsystem for Bit–Slice Processors; F. T. Burkowski; pp. 35–46, Dec. 3, 1985.

*Primary Examiner*—Daniel H. Pan
*Attorney, Agent, or Firm*—Fliesler, Dubb, Meyer & Lovejoy

[57] ABSTRACT

A single-chip microprogrammable sequencer (10) provides a bus (12) for connection of an external microprocessor. The sequencer includes a register file (40) which consists of a number of registers accessible to the microprocessor by which the microprocessor can monitor and control operation of the sequencer. The sequencer also includes a writeable control store (52) which is accessible to the microprocessor. Microinstructions may be written to the store by the microprocessor so that selected programs or program segments will be executed by the sequencer. A breakpoint register (104), included in the register file, is used in conjunction with a program counter portion of the sequencer providing a breakpoint facility for the microprocessor. Similarly, start, halt, reset and single-step operations may be performed by the sequencer under control of the microprocessor.

11 Claims, 3 Drawing Sheets

PROGRAMMABLE SEQUENCHER HAVING INTERNAL COMPONENTS WHICH ARE MICROPROCESSOR READ/WRITE INTERFACABLE

CROSS-REFERENCE TO RELATED PATENTS AND CO-PENDING APPLICATIONS

Related patents of interest in the instant application are U.S. Pat. No. 5,179,716 entitled "Programmable, Expandable Controller With Flexible I/O" to Agrawal et al., U.S. Pat. No. 4,967,346 entitled "Universal Microprocessor Interface" to Freidin, and U.S. Pat. No. 4,835,414 entitled "Flexible, Reconfigurable Terminal Pin" to Freidin. This application is a continuation of U.S. application Ser. No. 07/601,039, filed on Oct. 23, 1990, now abandoned, which is a continuation of Ser. No. 07/401,522 filed on Aug. 28, 1989, now abandoned, which is a continuation of Ser. No. 07/167,592 filed on Mar. 14, 1988, now abandoned.

FIELD OF THE INVENTION

This invention relates generally to digital controllers known as sequencers or state machines, and more particularly, to single-chip programmable digital sequencers having an on-chip interface to an external microprocessor.

BACKGROUND OF THE INVENTION

Known in the art are sequencers which operate autonomously with only condition codes to control program flow. One such sequencer is manufactured as an integrated circuit by Advanced Micro Devices, Inc. and designated the Am29PL141. This integrated circuit has an on-chip read-only memory which can store a "control program". An advance over the Am29PL141 is described in the related, co-pending application "Programmable, Expandable Controller With Flexible I/O" and such description is incorporated by reference herein. In one aspect of this invention, the advance includes the provision of an on-chip memory which is a random access memory (RAM) type. The RAM is used to store "microinstructions" which form a control program for the sequencer. In this sequencer, the control program can be dynamically altered which provides some external control over the sequencer.

Ideally, the sequencer should be accessible to an external microprocessor so that a wide variety of status conditions can be monitored by the microprocessor. Changes in the control program can then be dynamically made based on these status conditions internal to the sequencer as well as conditions external to the sequencer which are sensed by the microprocessor.

An interface, preferably integral to the integrated circuit housing the sequencer, should enable one of a number of commonly-used microprocessors to be connected to the integrated circuit.

SUMMARY OF THE INVENTION

A single-chip sequencer is provided having a bidirectional bus compatible with a number of common microprocessors. The bus terminates on a set of pins of the chip housing the sequencer. Standard signals are applied to pins of the chip which permit reading and writing of information by the microprocessor to various elements of the sequencer. Among these elements are a writable control store (WCS) which contains one or more control programs for the sequencer.

The status of various registers, a stack, a program counter, a pipeline register used for the WCS, and several user-registers, among others, can be accessed by the microprocessor.

The single-chip bus-compatible sequencer of the present invention requires no external control store or other support circuitry. A microprocessor can be connected to the chip with little or no logic circuitry. In one aspect of the instant invention, the sequencer operates in either of two modes: one mode employs a read strobe and a write strobe for reading and writing by the microprocesser and is compatible then with microprocessors manufactured by the Intel Corporation. In a second mode the sequencer employs a data strobe and the direction of transfer on the bus is set by a read/write input signal. In this mode the sequencer is compatible with microprocessors manufactured by the Motorola Corporation. The sequencer provides a mechanism for detecting which type of microprocessor is connected to it and can automatically set the mode for compatibility with that particular microprocessor.

DETAILED DESCRIPTION OF A PREFERRED EMBODIMENT

Figure 1:
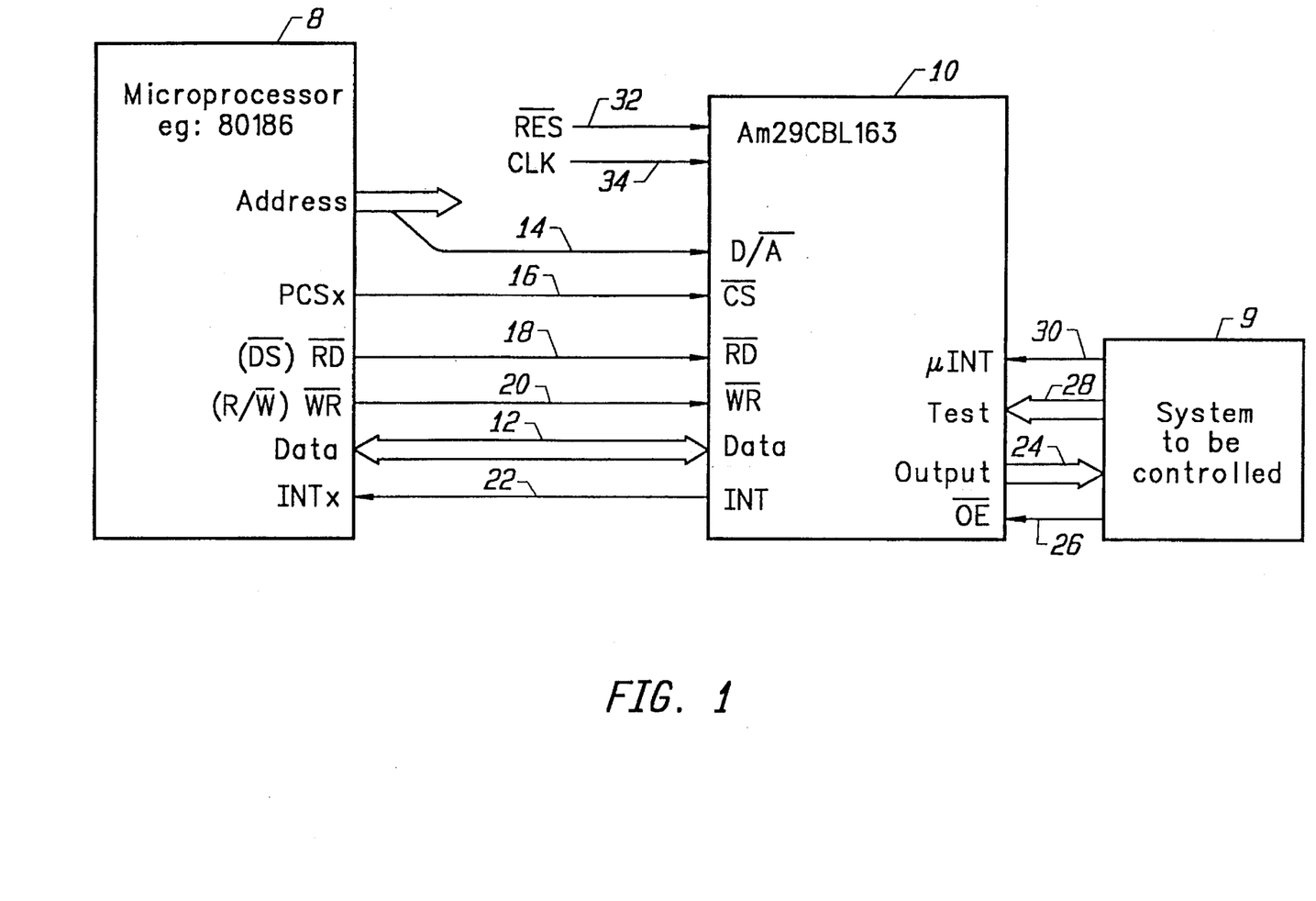
FIG. 1 illustrates an application of the bus-compatible sequencer of the present invention interconnected to a microprocessor.

FIG. 1 illustrates a typical application of a sequencer 10 according to the instant invention, connected to a microprocessor 8 and an object to be controlled 9 by the sequencer 10.

The signals conducted on the lines shown in FIG. 1 have the following description.

Data lines $D_7$-$D_0$ form bidirectional data bus 12 and are active high three-state, bidirectional lines for transfer of data to and from a microprocessor.

$D/\overline{I}^{18}$ A [Data/⁻Address] 14 input is for differentiating between Data and Address transfers. This signal line would normally be connected to the least significant address line of the host microprocessor bus in order to simplify control of communications.

⁻CS [Chip Select] 16 is an active low input which enables a transfer to begin between the sequencer 10 and the host microprocessor.

⁻RD [Read (Mode 0)] or ⁻DS [Data Strobe (Mode 1)] 18 is dependent on the mode to which the sequencer 10 has been set (after the first write cycle in the case of mode1). In mode 0, the pin connected to line 18 behaves as a read strobe, and a read access is performed when it is received. In mode 1, the pin behaves as a data strobe and a read or write access is performed depending on the state of the R/⁻W line.

⁻WR [Write (Mode 0)] or R/⁻W [Read/Write (Mode 1)] 20 depends on the mode to which the sequencer 10 has been set (after the first write cycle in the case of mode one). In mode 0, the pin connected to line 20 behaves as a write strobe, and a write access is performed when it is received. In mode 1, the pin behaves as a read/write indicator.

INT [Interrupt] 22 is an active high output that provides an interrupt to the host microprocessor when one or more interrupt mask registers bits are unmasked and the relevent status bit(s) become active.

OUTPUT lines $I/O_{15}$-$I/O_0$ form a bidirectional Input/ Output bus 24: as an Output is connected to an internal writable control store (WCS) via a pipeline register. These pins can be individually reconfigured as registered inputs by changing the contents of an Output Disable (O_DIS) register appropriately.

¯OE [Output enable] 26 is an active low input to enable the relevent bits of the Output bus which are not masked by an Output Mask (O_MSK) register, or disabled by the O DIS register.

Test lines $T_7$-$T_0$ [Test Inputs] 28 are a set of eight test inputs which are used to conditionally control the flow of the microprogram in the sequencer 10. The polarity of the test is programmable by a bit in the micro code. These inputs are registered.

µINT [Micro-interrupt] 30 is a low-to-high edge triggered input to indicate that a micro-interrupt routine should be executed. WCS bit 43 in the micro code, in conjunction with a Control 1 Register bit 0, enables or disables this interrupt. After an interrupt has been recognized, no further interrupts are recognized until after the first instruction of the current interrupt has been executed. If interrupts are enabled, there is a synchronization latency of at least 1 cycle, and at most 2 cycles, from the rising edge of µINT to the first cycle of the interrupt routine.

¯RES (¯RESET) 32 is an active low input that causes a reset of the sequencer 10.

CLK [Clock] 34 is an input that supplies a synchronizer clock for all elements of sequencer 10 except for a bus interface control block 36.

Figure 2:
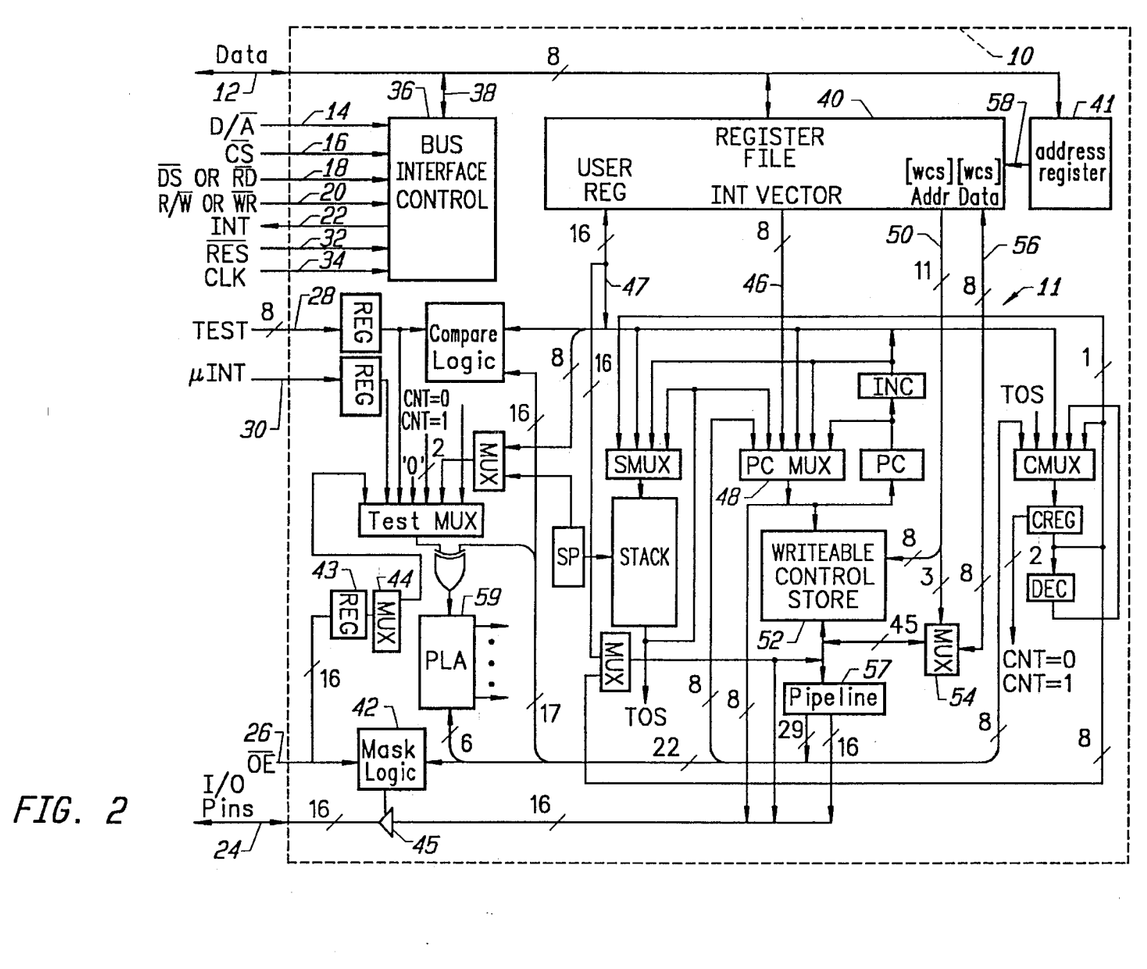
FIG. 2 is a block diagram of a bus-compatible sequencer according to the instant invention.

FIG. 2 is a block diagram of a sequencer 10 in accordance with the instant invention. The sequencer 10 depicted in FIG. 2 is preferably fabricated as a single monolithic integrated circuit (chip). Access to the elements within the boundary of the chip is via terminals (pins) of the chip. Signal lines crossing the boundary of the chip shown on the left side of FIG. 2 are among those lines connected to the pins. Signal lines shown in FIG. 2 have a number adjacent to a slash through the signal line. This number indicates the number of conductors comprising the signal line and allows that number of signals to be conducted in parallel.

A bus interface control 36 receives the D/$\overline{A}$, $\overline{CS}$, $\overline{RD}$ ($\overline{DS}$) and $\overline{WR}$ (R/$\overline{W}$) signals from the host microprocessor and generates the INT signal thereto, if an interrupt condition occurs and is unmasked. The bus interface control 36 is connected to data bus 12 via a set of control lines 38. The structure and operation of the bus interface control 36 is conventional in all respects except for the automatic configuration into mode 0 or 1 which allows bus 12 compatibility with Intel or Motorola microprocessors, respectively. This aspect of the invention is described in the related "Universal Microprocessor Interface", and such description is incorporated by reference herein.

In its other aspects the bus interface control 36 will not be described herein since it is conventional and known to those of ordinary skill in the art.

A register file 40 contains a variety of registers accessible to the host microprocessor via data bus 12. A description of register file 40 will be given hereinbelow in connection with FIG. 3. An address register 41 is used in conjunction with register file 40 and will likewise be described in connection with FIG. 3. Conceptually, the register file 40 is seen by the host microprocessor as a single set of addressable registers, organized as a file. However, the register file 40 is implemented to permit the sequencer 10 access to the contents of the various registers and to allow modification of the contents of more than one register therein during a single cycle of the sequencer.

The remaining elements shown in FIG. 2 and denoted generally by reference numeral 11, other than a Mask Logic 42, a register 43, a multiplexer (MUX) 44, and a tri-state buffer 45, are described in the related, co-pending application "Programmable, Expandable Controller With Flexible I/O" and such description is incorporated by reference herein. Particular attention is drawn to the block diagram of FIG. 2 in that related application, which is similar in all important respects to that portion of FIG. 2 labelled by numeral 11, other than as described above. Mask Logic 42 and tri-state buffers 45 permit terminal pins 24 to operate as either input or output terminals, as determined by the 0E signal on line 26 and a microinstruction stored in WCS 52. This aspect of the sequencer 10 is described in the related, co-pending application entitled "Flexible, Reconfigurable Terminal Pin", and such description is incorporated herein by reference.

Register file 40 includes four user registers (USER0, USER1, USER2 and USER3) which are accessible via a bus 47 by elements of sequencer 10. A bus 46 interconnects the register file 40 and inputs to a PC MUX 48. A bus 50 conducts a writable control store (WCS) address from register file 40 to WCS 52 and to a bidirectional multiplexer (MUX) 54. The MUX 54 also is connected to register file 40 by a bidirectional bus 56 conducting WCS data to and from WCS 52.

The writable control store (WCS) 52 is preferably arranged as 256 words each of 45 bits. It is accessed by the microprocessor via the bus interface control block 36, which reads or writes six bytes for each word of the micro code. The output of the WCS 52 is pipelined (via pipeline register 57) and the word separated into seven fields depending on an instruction format.

Sixteen bits of the micro code word (0–15) are output on signal lines 24 from the sequencer via tri-state buffer 45. The upper byte can be replaced by the output of the PC-MUX 48 by setting bit 0 of a CONTROL 2 register 88 (Enable µPC), and the lower byte can be replaced with the lower 8 bits of the counter by setting bit 1 of the CONTROL 2 register 88 (or by executing a TXC instruction). In addition, all 16 output bits can be replaced by the contents of one of the User registers by executing a TXU instruction. Finally, any of these output pins can be individually reconfigured as an input pin by setting an O_DIS register 98, 100 appropriately.

Sixteen bits of the micro code word (31–16) form a data field which is used for various functions, such as branch addresses or user register addresses, The lower 8 bits of this field may be used for data while the upper 8 bits are used as a Mask value. Alternatively, the upper 8 bits are used as a Mask value, while the 2 LSBs are used as a User Register Select field and the other 6 bits are unused. In another situation, the 2 LSBs are used as the User Register Select field while the remaining 14 bits are unused.

Four bits of the micro code word (35–32) select one of the 16 possible test inputs on lines 28 or a 5 bit Register Select field (the fifth bit is the Polarity bit in an instruction that uses the Test field).

One bit of the micro code (36) selects the polarity of the test (true or false) for use with the Test field. Alternatively, it is combined with the 4 bits of the Test field to make up a Register Select field.

Six bits of the micro code word (42–37) make up the instruction and go to a PLA block 59 to be decoded into the signals which control the sequencer operation.

One bit of the micro code word (43) enables micro-interrupts when set, but it can be overridden by bit 0 of the CONTROL 1 register 86. This allows the user to have, for example, a subroutine which normally enables interrupts but which, when called from certain places in the program, has its ability to enable interrupts blocked.

One bit of the micro code word (44) enables the relevent bits of the Output buffers which are not masked by the WCS_OE registers or disabled by the O_DIS register.

The address register 41 is accessed by the microprocessor when the D/¯A signal is LOW; otherwise the microprocessor is connected to data registers within register file 40. The contents of address register 41 conducted to register file 40 on bus 58 determines which data register is to be accessed by the microprocessor, in accordance with Table I.

TABLE I

REGISTERS WITHIN REGISTER FILE 40

| Reg. Addr | Hex | Register Name (Read) | Register Name (Write) |
|---|---|---|---|
| 0000000 | 00 | MAN_ID | — |
| 0000001 | 01 | REV | — |
| 0000010 | 02 | PART$_1$ | — |
| 0000011 | 03 | PART$_2$ | — |
| 0011110 | 1E | STATUS | STATUS |
| 0100000 | 20 | WCS_A | WCS_A |
| 0100010 | 22 | WCS_D | WCS_D |
| 0100100 | 24 | TestG_1 | TestG_1 |
| 0100101 | 25 | TestG_2 | TestG_2 |
| 0100110 | 26 | CONTROL 1 | CONTROL 1 |
| 0100111 | 27 | CONTROL 2 | CONTROL 2 |
| 0110000 | 30 | OE_MSK$_L$ | OE_MSK$_L$ |
| 0110001 | 31 | OE_MSK$_H$ | OE_MSK$_H$ |
| 0111000 | 38 | WCS_OE$_L$ | WCS_OE$_L$ |
| 0111001 | 39 | WCS_OE$_H$ | WCS_OE$_H$ |
| 0111010 | 3A | O_DIS$_L$ | O_DIS$_L$ |
| 0111011 | 3B | O_DIS$_H$ | O_DIS$_H$ |
| 1000000 | 40 | INT_MASK | INT_MASK |
| 1000010 | 42 | BRKPOINT | BRKPOINT |
| 1000100 | 44 | PCINT_VECT | PCINT_VECT |
| 1000110 | 46 | MODE | MODE |
| 1001000 | 48 | TEST | TEST |
| 1001010 | 4A | IOTEST$_L$ | IOTEST$_L$ |
| 1001011 | 4B | IOTEST$_H$ | IOTEST$_H$ |
| 1001100 | 4C | U_TEST | U_TEST |
| 1001101 | 4D | WRT_FLGS | WRT_FLGS |
| 1001110 | 4E | TEST_SEL | TEST_SEL |
| 1010000 | 50 | USER_0$_L$ | USER_0$_L$ |
| 1010001 | 51 | USER_0$_H$ | USER_0$_H$ |
| 1010010 | 52 | USER_1$_L$ | USER_1$_L$ |
| 1010011 | 53 | USER_1$_H$ | USER_1$_H$ |
| 1010100 | 54 | USER_2$_L$ | USER_2$_L$ |
| 1010101 | 55 | USER_2$_H$ | USER_2$_H$ |
| 1010110 | 56 | USER_3$_L$ | USER_3$_L$ |
| 1010111 | 57 | USER_3$_H$ | USER_3$_H$ |
| 1100000 | 60 | µPC | µPC |
| 1100010 | 62 | STCK_PT | STCK_PT |
| 1100100 | 64 | TOS$_L$ | TOS$_L$ |
| 1100101 | 65 | TOS$_H$ | TOS$_H$ |
| 1100110 | 66 | COUNT$_L$ | COUNT$_L$ |
| 1100111 | 67 | COUNT$_H$ | COUNT$_H$ |
| 1101000 | 68 | RO_STK$_L$ | RO_STK$_L$ |
| 1101001 | 69 | RO_STK$_H$ | RO_STK$_H$ |
| 1110000 | 70 | PIPE$_{7..0}$ | PIPE$_{7..0}$ |
| 1110001 | 71 | PIPE$_{15..8}$ | PIPE$_{15..8}$ |
| 1110010 | 72 | PIPE$_{23..16}$ | PIPE$_{23..16}$ |
| 1110011 | 73 | PIPE$_{31..26}$ | PIPE$_{31..26}$ |
| 1110100 | 74 | PIPE$_{39..32}$ | PIPE$_{39..32}$ |
| 1110101 | 75 | PIPE$_{47..40}$ | PIPE$_{47..40}$ |

TABLE I-continued

Figure 3:
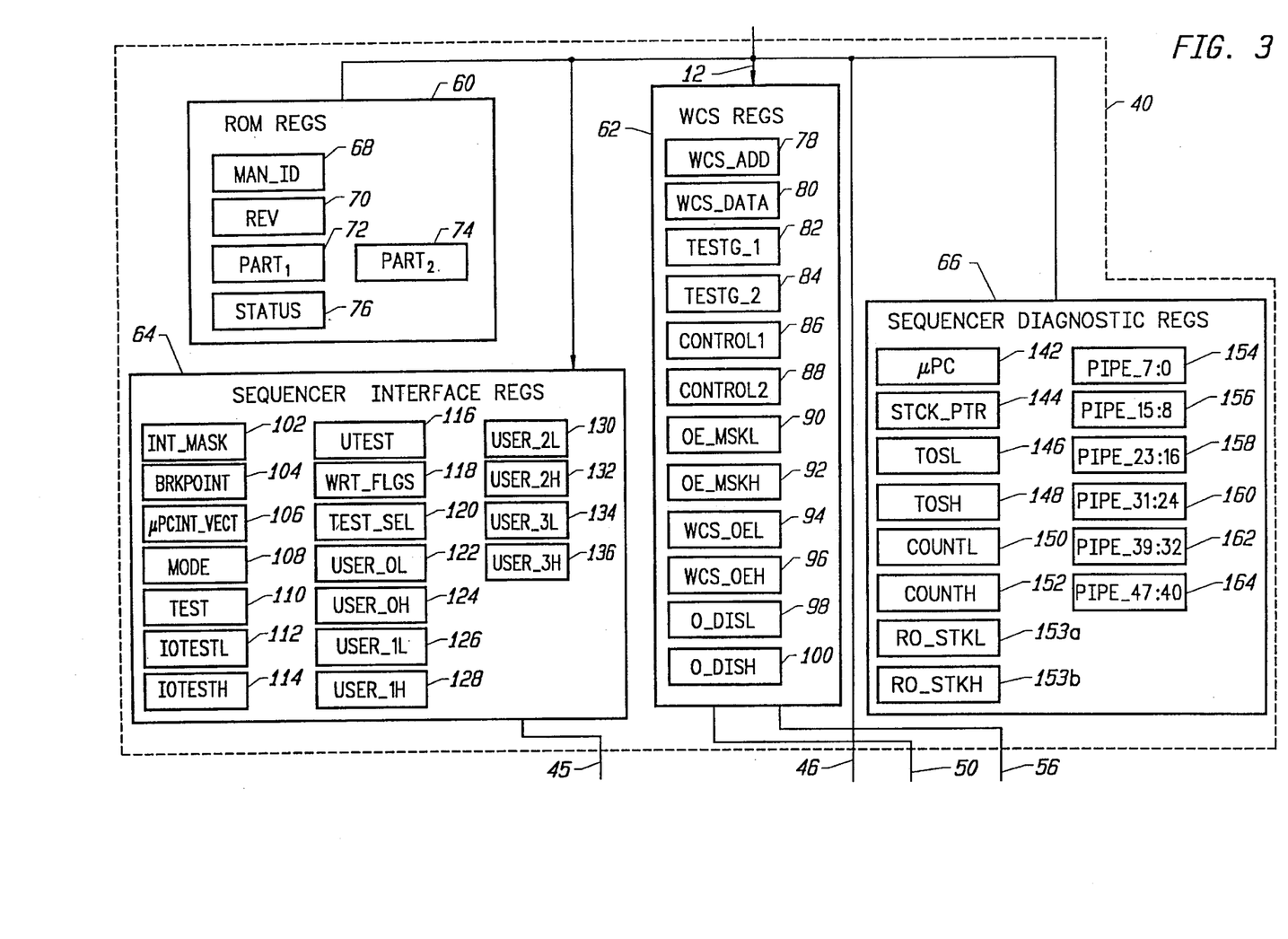
FIG. 3 is a block diagram of the registers within the register file employed in the bus-compatible sequencer.

With reference now to FIG. 3, Register File 40 is shown in block diagram form. Register File 40 consists of four groups of registers: read-only registers (ROM REGS) 60, Writable Control Store registers (WCS REGS) 62, Sequencer Interface Registers 64, and Sequencer Diagnostic Registers 66.

ROM Registers 60 provide information about the sequencer to the host microprocessor.

MAN_ID 68 contains the manufacturer's identity code. REV 70 contains the revision number. PART 72, 74 contain the device part number.

The Status Register 76 serves as the source of interrupts to the host processor, enables the host to establish the cause of an interrupt or to poll the status of the sequencer 10. Each of the bits in this register can generate an interrupt to the host when they are set, if their corresponding mask bit in an Int_Mask register 102 is cleared. While the Status Register is not strictly a ROM location, it is included in this group because it is not setable by the host processor. Instead, writing ones to the status register serves to clear the appropriate bits. For example, if 0000 0001 is written to the Status Register, then the IO flag (or interrupt) is cleared and all the other bits are unchanged. The Status Register 76 contains seven bits which are defined as follows:

A HALT bit indicates that the sequencer has executed a halt instruction. It is not set when the sequencer is halted by the host microprocessor through the Halt bit in a mode register;

A BREAK bit indicates that the sequencer has reached a breakpoint;

An A_FULL bit indicates that the sequencer stack has 28 or more entries in it, and that some action may need to be taken to avoid a possible stack overflow;

A SEQ_LD bit indicates that the sequencer has caused one of the user registers 122, 124, 126, 128, 130, 132, 134, 136 to be loaded;

A SEQ_INT bit indicates that the INT instruction has been executed by the sequencer;

A µINT bit indicates that the micro-interrupt line has been asserted; and

An IO bit indicates the selected test input has been asserted. The selection is made with bits 0 to 2 of a Test_Sel register 120, and the polarity is selected by bit 7 of the Test_Sel register.

The Writable Control Store Registers 62 group of registers are the means by which the host microprocessor can access the writable control store 52 and control its contents. All these registers can be read and written by the microprocessor.

A WCS Address (WCS_A) register 78 holds the address of a micro-word in the WCS 52. To read or write a full word of the WCS 52, the host microprocessor must read or write 6 bytes of data. When 6 bytes of data have been read or written, the WCS_A register is automatically incremented. This operation is achieved by means of a 3 bit counter (not shown) which is cleared by a write to the WCS address register 78 and which counts in modulo 6 fashion thereafter so as to multiplex the bytes into the proper position in the WCS word (the low order byte is the first byte read or written). To send a block of data, the host microprocessor sets up the base address by writing to the WCS address register 78 and then sends micro-code words in multiples of 6 bytes to a WCS data register 813.

The WCS_Data (WCS_D) register 80 is the means by which the host microprocessor writes to or reads from the WCS 52.

A Test Group 1 (TESTG_1) Register 82 and a Test Group 2 (TESTG_2) Register 84 contain bit patterns indicative of which of the TEST signals 28, or internal signals is selected by the TEST MUX, to be tested by a particular microinstruction.

A CONTROL1 register 86 holds the micro-interrupt enable bit (µIEN, bit 0). This bit operates in conjunction with bit 42 of the WCS as shown below.

| CONTROL REGISTER BITS | | |
|---|---|---|
| Control 1 µIEN (bit 0) | WCS µIEN (bit 43) | Result: Interrupts are: |
| 1 | 0 | Ignored |
| 1 | 1 | Accepted |
| 0 | x | Ignored |

Also included in the CONTROL1 register is an EQ bit, which allows the state of the EQ flag to be saved and restored in the event of an interrupt. This bit can be read to obtain the current state and can be set or cleared as desired in order to restore it.

A CONTROL2 register 88 contains a:

Bit 0 (EN_µPC) which when set, places the 8 bit value of the micro-code address on the upper byte of the input/output lines 24;

Bit 1 (EN_TXC) which when set, places the lower byte 150 of the counter register (COUNT) 150, 152 on the lower byte of the output lines;

Bit 2 (BRK Match Report bit) which when set, causes the interrupt pin to output the break match logic status so that when a breakpoint match occurs, it is driven high for the duration of the instruction. The sequencer continues to run without halting. This is useful when a trigger is desired on the occurrence of the breakpoint but the sequencer should not be halted, as might be the case for oscilloscope-loop type diagnostics. When this bit is on, all normal sources of interrupt are blocked, as if EN_INT in the Mode register 108 was set to zero. The BRKEN bit in the Mode register is also ignored.

An OE_MSK register 90, 92 comprising an OE_MSK_l-l register 90 and an OE_MSKl-l register 92 provides a mask which determines which bits of the Output bus 24 are affected by the ¯OE input signal on line 26. Output bits are three-stated by the ¯OE pin only if bits in the mask register 90, 92 are set to a '1'. Since the ¯OE signal is a low-true input, the ¯OE pin can only three-state the relevant bits of I/O bus 24 when it is a '1' as well.

A WCS_OE register 94, 96 comprising a WCS_OE_ register 94 and a WCS_OEl-l register 96 performs a similar function to that of the OE_MSK register. The WCS_OE register masks bits of the Output bus 24 which are to be three-stated by the ¯OE bit in the micro-word. Output bits are three-stated by the ¯OE bit in the micro code only if bits in the WCS_OE register are set to a '1'. Since the ¯OE bit is an active low micro-code bit, the ¯OE bit can only three-state the relevant bits of the bus when it is a '1' as well.

An Output Disable (O_DIS) register 98, 100 comprising an O_DIS_l-l0 register 98 and an O_DIS_l-l register 100 is a mask register similar to the two previous mask registers in that it selects which pins will be enabled as outputs. The difference is that while WCS_OE and OE_MASK can allow pins to be selectively enabled, O_DIS forces pins to be always disabled, allowing them to be used as additional test inputs. This disabling function overrides the function of the WCS_OE, OE_MASK, EN_µPC, and EN_TXC. When a bit in this register is set, the corresponding output is disabled.

The operation of the OE_MSK registers 90, 92, the WCS_OE registers 94, 96, the O_DIS registers 98, 100, the OE signal line 26 and the OE flag in a microinstruction is summarized in Table II.

TABLE II

| O_DIS | ¯OE (µcode) | WCS_OE (Mask) | ¯OE (Pin) | OE_MASK (Pin Mask) | INPUT/OUTPUT Bus 24 |
|---|---|---|---|---|---|
| 0 | 0 | 0 | 0 | 0 | Driven |
| 0 | 0 | 0 | 0 | 1 | Driven |
| 0 | 0 | 0 | 1 | 0 | Driven |
| 0 | 0 | 0 | 1 | 1 | Three-state |
| 0 | 0 | 1 | 0 | 0 | Driven |
| 0 | 0 | 1 | 0 | 1 | Driven |
| 0 | 0 | 1 | 1 | 0 | Driven |
| 0 | 0 | 1 | 1 | 1 | Three-state |
| 0 | 1 | 0 | 0 | 0 | Driven |
| 0 | 1 | 0 | 0 | 1 | Driven |
| 0 | 1 | 0 | 1 | 0 | Driven |
| 0 | 1 | 0 | 1 | 1 | Three-state |
| 0 | 1 | 1 | 0 | 0 | Three-state |
| 0 | 1 | 1 | 0 | 1 | Three-state |
| 0 | 1 | 1 | 1 | 0 | Three-state |
| 0 | 1 | 1 | 1 | 1 | Three-state |
| 1 | X | X | X | X | Three-state |

The Sequencer Interface Block of registers 64 is the means by which the host microprocessor may affect the sequence of micro code executed. These registers can all be read and written by the microprocessor.

An Interrupt mask (INT_MASK) register 102 is used to mask off unwanted interrupts to the host microprocessor. The bit positions correspond directly to bits in the Status register 76 described hereinabove. To enable an interrupt the relevent bit should be cleared. When the host microprocessor receives an interrupt it can read the Status Register 76 to determine from the bit pattern which of several possible interrupts actually occurred. Upon learning which interrupt occurred, the host microprocessor can then write a 1 to the corresponding bit in the Status register to reset it while leaving all the other interrupt bits unaffected. An enabled interrupt will continue to be asserted to the host processor until the host does one of three things:

1. Set bits in the Int_Mask register 102 for all pending interrupts (bits that are set in the Status register); or
2. Clear all unmasked pending interrupts by writing ones to the Status register; or
3. Clear the En_Int bit in a Mode register. This register is read/write.

A BRKPOINT register 104 allows the sequencer to stop (or generate an interrupt) at a particular point in the micro code. A breakpoint can be set by writing an address into the breakpoint register. When the breakpoint is reached, bit 6 of the Status register 76 is set and the appropriate action taken (halt or interrupt). This register is read/write.

The micro-interrupt vector (PCINT_VECT) register 106 specifies the address for micro-interrupts (interrupts to the sequencer). When micro-interrupts are enabled and an interrupt occurs, this register supplies the starting address of the micro-interrupt service routine. The interrupt return address is pushed onto the stack while the first instruction of interrupt service routine is being executed. This register is read/write.

A mode register 108 controls the global operation of the sequencer; such as start, halt, stop at breakpoint and reset. This register is read/write. It contains a START bit, which when set, allows the sequencer to execute micro code. This bit must be set after a reset condition, or after the sequencer is halted or a breakpoint has occurred, in order to start or restart the sequencer. However, if a HALT bit in the Mode register has been set but not yet cleared, then setting the START bit will cause the sequencer to perform a single step operation. The HALT bit in the Status register has no effect on the restarting of the sequencer.

A μHALT bit, when set, halts the sequencer after the current cycle. The contents of all registers will be maintained. The microprocessor may change values in the sequencer (e.g., for debugging) and restart the sequencer. The microprocessor may also use this bit to halt the sequencer in the event of a micro code failure. This bit allows a single-step mode since a START will cause the sequencer to halt again after only one instruction has been executed.

A BRKEN bit, when set, enables the breakpoint facility. The host microprocessor writes an 8-bit address into the breakpoint register 104 and when the μPC address equals the breakpoint register value, the sequencer will stop on the next cycle, unless the BRK_Match_Report bit (CONTROL 2 register 88 bit 2) is set, in which case an interrupt will be generated instead.

A EN_INT bit, when set, allows the sequencer to interrupt the host microprocessor when one or more of the interrupt conditions occur. It is ignored if the BRK_Match_Report bit 2 of the CONTROL2 register 88 is set.

A SINGLE_STEP_DONE bit is set by any successfully run sequencer cycle, and will therefore be always on during normal execution.

A RESET bit, when set, will initiate a software reset of the sequencer. When read back, a 1 indicates that the device is in the process of performing a reset. This bit automatically returns to 0 when the reset operation is complete.

A Test register 110, when read, indicates the value of the registered Test inputs on line 28.

An IOTEST register 112, 114 comprising an IOTEST register 112 and an IOTEST register 114 forms a 16 bit register which holds the synchronized value of the I/O pins on bus 24. If any of these I/O pins have been selected as inputs by the O_DIS register 98, 100 then the contents of the IOTEST register can be used as test inputs, as selected by the Test Group 2 register 84.

U_TEST register 116 contains four bits which are set by the microprocessor and accordingly user defined.

A WRT_FLGS register 118 allows access to four semaphore flags. These flags are set whenever a write to the corresponding User register (high byte only) has taken place from either the sequencer or the host microprocessor. They are cleared whenever either the sequencer or the microprocessor reads the high byte of the register.

A Test Select (TEST_SEL) register 120 is used to select one of the 8 registered Test input pins 28 to serve as the I/O input to the Status register 76 and so be capable of causing an interrupt to the host microprocessor. An I/O Pol bit is used to select the polarity of the test inputs for use as an interrupt. If I/O Pol is 0 then a low to high transition on the selected registered test input can cause an interrupt. If I/O Pol is 1, then a high to low transition is required to cause an interrupt. For either case, I/O interrupts only occur if the I/O mask bit in the Int_Mask register is clear.

USER_0, USER_1, USER_3, and USER_4 registers 122, 124, 126, 128, 130, 132, 134, 136 are four 16-bit user definable registers comprising a low-order register 122, 126, 130, 134 and a high-order register 124, 128, 132 and 136, respectively, which can be read and written by both the host microprocessor and the sequencer. The sequencer can use the contents of these registers as branch addresses or data values. When the high byte of one of these registers is written, the corresponding W flag (Write Flag) in register 118 is also set. This allows either the host microprocessor or the sequencer to sense that the other has written something into a User register, which it can now read when needed, so that these flags serve as a semaphore communication system between the processors. A flag is cleared by either the microprocessor or the sequencer reading the high byte of the appropriate register.

Sequencer Diagnostic Registers 66 enable the host microprocessor to read or write the sequencer registers. This is especially useful for testing and debugging micro code.

A μPC Register 142 contains the value of the Program Counter of the sequencer.

A STCK_PTR Register 144 contains the value of the stack pointer. After a stack pointer reset, the value in STCK_PTR register 144 is set to zero; a pre-increment is performed on a Push operation prior to writing to the top of the stack and a post-decrement is performed after the top of the stack is read.

A TOS register 146, 148 comprising a low-order register 146 and a high-order register 148 contains the 16-bit value currently in the top of stack of the sequencer A COUNT register 150, 152 comprising a low-order register 150 and a high-order register 152 contains the 16-bit value currently in the counter of the sequencer.

A BO_STK register 153a, 153b comprising a low-order register 153a and a high-order register 153b contains the 16-bit value currently at the bottom of the stack of the sequencer.

A PIPE register comprising six registers 154, 156, 158, 160, 162 and 164 contains the 45-bit value currently in the WCS pipeline register 57 (6 bytes, written or read one byte at a time, starting with the low order byte). The ability to read or write this register allows the user the ability, for example, to force a particular instruction to be executed by halting the sequencer, writing a new value into the pipeline register 57, and then restarting the sequencer.

There are two types of interrupts that involve the sequencer 10:

1. The sequencer can generate an interrupt to the host from one of seven sources as indicated by the contents of the status register 76. These sources are all maskable by the INT_MSK register 102 so that interrupts to the host can be completely disabled. The sources that can cause an interrupt are also reflected in the status register, so the host microprocessor can poll for a particular event. This interrupt does not affect the sequencer's operation.

2. The sequencer can receive a micro-interrupt which will cause an interrupt routine to be executed by the sequencer. The next address is saved on the stack and the contents of the PCINT_VECT register 106 are used for the starting address of the interrupt routine. If micro-interrupts are enabled during the interrupt routine, the micro-interrupt could be allowed to interrupt again (i.e., nested interrupts). The micro-interrupt routine must disable interrupts until it has saved its state information. Initially this disable can be performed by the 1EN micro-code control bit. After the first cycle of the interrupt routine, the IEN control bit in the CONTROL1 register 86 can be used to inhibit micro-interrupts.

What is claimed is:

1. A programmable sequencer which is accessible by a host processor, the sequencer comprising:

a bidirectional bus for carrying host processor compatible address, data, and control signals to and from the host processor;

sequencing elements including one or more first elements for receiving control signals, second elements for generating an address in accordance with the control signals, and a third element for supplying the address; and duplicate registers, each duplicate register being connected to the bidirectional bus and to one of the second elements to enable the host processor to access contents of the second elements and avoid making predictions to determine the contents of the second elements based on the control signals.

2. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals;

a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements;

system interface means for providing interconnection between the programmable sequencer and a system; and a PLA block for receiving a portion of one of the microcode words and for receiving system status signals, TEST, μINT, I/O, from the system over the system interface means and for generating therefrom one or more of the control signals.

3. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals; and a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements.

4. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals; and a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements, wherein the plurality of registers comprise:

a plurality of sequencer diagnostic registers wherein a given sequencer diagnostic register in the plurality of sequencer diagnostic registers is connected to a given internal element in the plurality of internal elements, wherein the given sequencer diagnostic register receives a state of the given internal element, and wherein the given sequencer diagnostic register is readable by the host processor.

5. The sequencer of claim 4 wherein the given internal element carries a program count state.

6. The sequencer of claim 4 wherein the given internal element carries a stack pointer state.

7. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals; and a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements, wherein the plurality of registers comprise:

a status register for storing a plurality of status bits, wherein each status bit in the plurality of status bits is set to a logical level indicating a status set by an internal element in the plurality of internal elements, wherein the plurality of status bits are readable from the status register by the host processor, and wherein a status bit in the plurality of status bits includes one of a group consisting of:

a HALT bit indicating the sequencing means has stopped sequencing in response to the sequencing means processing a halt instruction;

a BREAK bit indicating the sequencing means has stopped sequencing in response to having reached a breakpoint; or a SEQ_INT bit indicating the sequencing means has processed an interrupt.

8. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals; and a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements, wherein the plurality of registers comprise:

a plurality of user interface registers for storing information received from either the host processor or the sequencing means; and a write flag register for storing a plurality of flag bits, wherein a given flag bit in the plurality of flag bits is associated with a given user interface register in the plurality of user interface registers and wherein the given flag bit is set to a logical level indicating whether the given user interface register was recently written to by either the host processor or the sequencing means.

9. A host-accessible programmable sequencer comprising:

a bidirectional bus for carrying host compatible address, data, and control signals to and from a host processor;

sequencing means comprising a plurality of internal elements, the sequencing means for receiving control signals and supplying an address in accordance with the control signals; and a register comprising a plurality of registers which each are connected to the bidirectional bus and to one of the plurality of internal elements, other than the internal element supplying the address and other than the internal elements to which the control signals are supplied, to enable the host processor to access contents of the plurality of internal elements, a writable control store having an input connected to the sequencing means for storing microcode words, wherein at least one of the microcode words comprises data provided from the host, wherein the writable control store supplies a particular one of the microcode words upon receipt of the address from the sequencing means, and wherein the register further comprises a second plurality of registers which are connected to the bidirectional interconnect bus and to the writable control store to enable the host processor to write to the writable control store.

10. The sequencer of claim 9 further comprising:

a pipeline register connected to the writable control store for receiving the particular microcode work selected from the writable control store and supplying a portion of the particular microcode word to a system.

11. The sequencer of claim 9 wherein the sequencer is fabricated on a single monolithic integrated circuit.

* * * * *